United States Patent
Della Vecchia et al.

(10) Patent No.: US 11,119,640 B2
(45) Date of Patent: Sep. 14, 2021

(54) CUSTOMIZATION OF AUTOMOTIVE INTERIORS VIA AUTOMOTIVE USER INTERFACES

(71) Applicant: FCA ITALY S.p.A., Turin (IT)

(72) Inventors: Silvio Della Vecchia, Turin (IT); Taulant Marpepa, Turin (IT); Vincenzo Nuara, Turin (IT)

(73) Assignee: FCA ITALY S.p.A., Turin (IT)

( * ) Notice: Subject to any disclaimer, the term of this patent is extended or adjusted under 35 U.S.C. 154(b) by 309 days.

(21) Appl. No.: 16/248,403

(22) Filed: Jan. 15, 2019

(65) Prior Publication Data

US 2019/0220179 A1 Jul. 18, 2019

(30) Foreign Application Priority Data

Jan. 16, 2018 (IT) .......................... 102018000001117

(51) Int. Cl.
*G06F 3/0484* (2013.01)
*B60R 11/02* (2006.01)
(Continued)

(52) U.S. Cl.
CPC .......... *G06F 3/04847* (2013.01); *B60K 35/00* (2013.01); *B60K 37/00* (2013.01);
(Continued)

(58) Field of Classification Search
CPC ................. G06F 3/04847; H04W 4/48; B06K 2370/573; B60K 2370/52;
(Continued)

(56) References Cited

U.S. PATENT DOCUMENTS

2012/0112828 A1* 5/2012 Richter .................. H02J 50/05
327/564
2014/0207338 A1 7/2014 Healey et al.
(Continued)

FOREIGN PATENT DOCUMENTS

DE 102016009319 A1 11/2016
WO 0052521 A2 9/2000
(Continued)

OTHER PUBLICATIONS

Techopedia, "Electrophoretic Ink," published on Oct. 7, 2012, downloaded at https://www.techopedia.com/definition/25201/electrophoretic-ink-eink (Year: 2012).*
(Continued)

*Primary Examiner* — Eric J Yoon
(74) *Attorney, Agent, or Firm* — Harness, Dickey & Pierce, P.L.C.

(57) ABSTRACT

An electronic customization system designed to allow an automotive interior to be customizable via a user terminal. The electronic customization system comprises electronic customization displays integrated in corresponding aesthetic/functional components of the automotive interior, and an electronic control unit configured to communicate and cooperate with the user terminal in order to allow the automotive interior to be customizable via the user terminal. The user terminal is configured to expose a graphical user interface configured to allow digital decorative wallpapers to be selectable for display on the electronic customization displays, and to transmit to the electronic control unit data indicative of the selected digital decorative wallpapers. The electronic control unit is configured to receive data indicative of the selected digital decorative wallpapers from the user terminal, and to cause the selected digital decorative
(Continued)

wallpapers to be displayed on the electronic customization displays.

4 Claims, 3 Drawing Sheets

(51) Int. Cl.
  *B60R 13/02* (2006.01)
  *B60K 35/00* (2006.01)
  *B60K 37/00* (2006.01)
  *H04W 4/48* (2018.01)

(52) U.S. Cl.
  CPC .......... *B60R 11/0235* (2013.01); *B60R 13/02* (2013.01); *B60R 13/0256* (2013.01); *H04W 4/48* (2018.02); *B60K 2370/52* (2019.05); *B60K 2370/573* (2019.05); *B60R 2013/0287* (2013.01)

(58) Field of Classification Search
  CPC .......... B60K 2370/163; B60K 2370/73; B60K 2370/741; B60K 370/00
  See application file for complete search history.

(56) References Cited

U.S. PATENT DOCUMENTS

| 2014/0355285 | A1  | 12/2014 | Yamato |
|---|---|---|---|
| 2015/0149042 | A1* | 5/2015 | Cooper .................. H04W 4/48 |
| | | | 701/48 |
| 2018/0032997 | A1* | 2/2018 | Gordon .............. G06Q 30/0269 |

FOREIGN PATENT DOCUMENTS

| WO | 2008148199 A1 | 12/2008 |
|---|---|---|
| WO | 2015138680 A1 | 9/2015 |
| WO | 2017131474 A1 | 8/2017 |
| WO | 2017191344 A1 | 11/2017 |

OTHER PUBLICATIONS

Slashgear website, "E-ink displays can be powered wirelessly with NFC," published Aug. 19, 2013, downloaded at https://www.slashgear.com/e-ink-displays-can-be-powered-wirelessly-with-nfc-19294194/ (Year: 2013).*

European Search Report issued in corresponding European Patent Application No. 191521905 dated Mar. 27, 2019 (10 pages).

Italian Search Report issued in corresponding Italian Patent Application No. 102018000001117 dated Jul. 3, 2018 (7 pages).

* cited by examiner

CUSTOMIZATION OF AUTOMOTIVE INTERIORS VIA AUTOMOTIVE USER INTERFACES

CROSS-REFERENCE TO RELATED APPLICATIONS

This European patent application claims the benefit and priority of Italian patent application no. 102018000001117 filed on Jan. 16, 2018, the entire disclosure of which is incorporated herein by reference.

TECHNICAL FIELD OF THE INVENTION

The invention relates, in general, to automotive interiors and, in particular, to customization of automotive interiors via automotive user interfaces.

STATE OF THE ART

As it is known, customization of motor vehicles still represents one of the key elements in the automotive industry, in an attempt to attract new customers and improve the so-called use experience.

A field in which the customization effort has been particularly strong is the customization of the operation of the different automotive on-board systems/devices, such as info-telematic systems and air conditioning systems, instruments displayed in the dashboard, inner lighting, positions of the steering wheel, the seats, and the inner and outer rear-view mirrors, etc., through the automatic setting of user preferences and profiles in response to the automatic identification of the users when they get on board the motor vehicles.

Another field in which the customization effort has been particularly strong is the customization of automotive interiors and exteriors when the motor vehicles are purchased, offering to buyers basically unlimited customization possibilities, from the colour of the body to the smallest detail, including rims and tyres, colours and materials of the interiors, decorations, finishes, etc.

Such a wide customization offer is the result of different factors, among which an important role is played by the differences in tastes and needs existing between the different population segments to which automotive manufacturers offer their products. Just think about the difference in tastes and needs that can exist between the so-called Generation X, including all those people who were approximately born between 1960 and 1980, ad the so-called Generation Y, more commonly known as Millennials, including all those people who were approximately born between the early 1980s and the early 2000s.

The above-mentioned wide customization possibilities are available for reasonable prices when the motor vehicles are purchased, but the post-sale customization possibilities are much more limited and, in any case, require significant economic efforts and long customization times.

Furthermore, the recent development of sustainable mobility policies, which are aimed at encouraging a shift from the ownership of motor vehicles to the use of motor vehicles shared with other users, has led to the foundation of different motor vehicle sharing services, where the shared motor vehicles, despite having, at least on the outside, distinctive features that allow users to distinguish them from the ones of other motor vehicle sharing services, fail to allow users to make any customization due to their shared nature.

OBJECT AND SUMMARY OF THE INVENTION

The object of the invention is to provide a simple, intuitive, and economic technology, which allows automotive interiors to be customized in any moment.

According to the invention, a motor vehicle is provided, as claimed in the appended claims.

DETAILED DESCRIPTION OF PREFERRED EMBODIMENTS OF THE INVENTION

The invention will now be described in detail with reference to the accompanying figures, so as to allow a person skilled in the art to carry it out and to use it. Possible changes to the embodiments described will be immediately evident to skilled people and the generic principles described can be applied to other embodiments and applications without for this reason going beyond the scope of protection of the invention as it is defined in the appended claims. Therefore, the invention cannot be considered as limited to the embodiments described and shown herein, but is has to be associated with the widest scope of protection possible in accordance with the features described and claimed herein.

Figure 1:
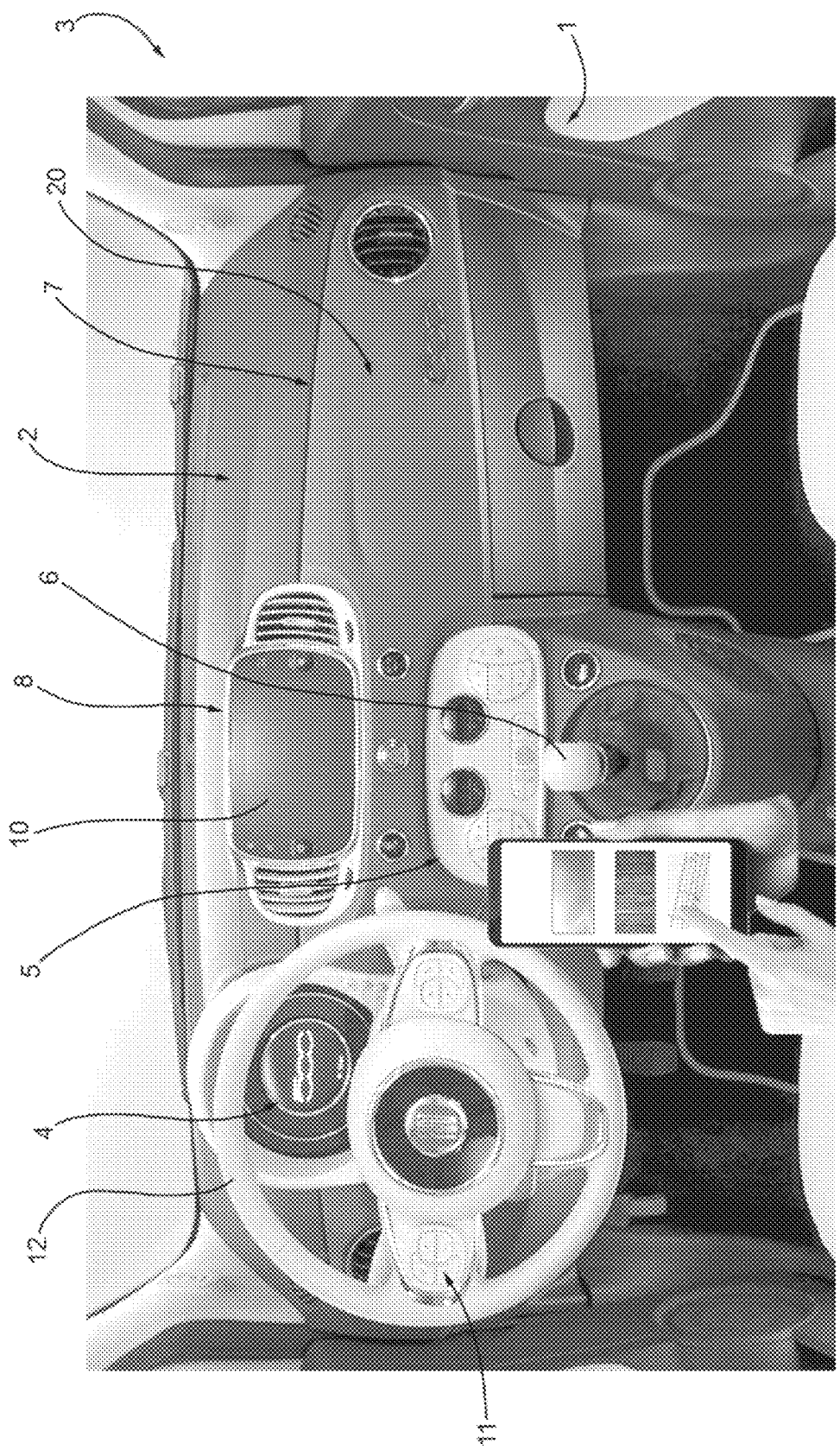
FIGS. 1 and 2 partially show an automotive interior before and after customization according to the invention.

FIG. 1 partially shows an automotive interior referenced as a whole with reference numeral 1 and made up, as is known, of different aesthetic/functional components.

By way of non-limiting example, of the automotive interior 1 FIG. 1 shows a dashboard 2, where an instrument panel 4 and a central console 5 are arranged, and a gear lever 6 arranged in the central console 5.

In the example shown in FIG. 1, the dashboard 2 is further provided with a trim or moulding 7 arranged on a front face of the dashboard 2 facing the occupants, and extending along a great part of the width of the dashboard 2, substantially from the instrument panel 4 to the opposite end of the dashboard 2.

Figure 3:
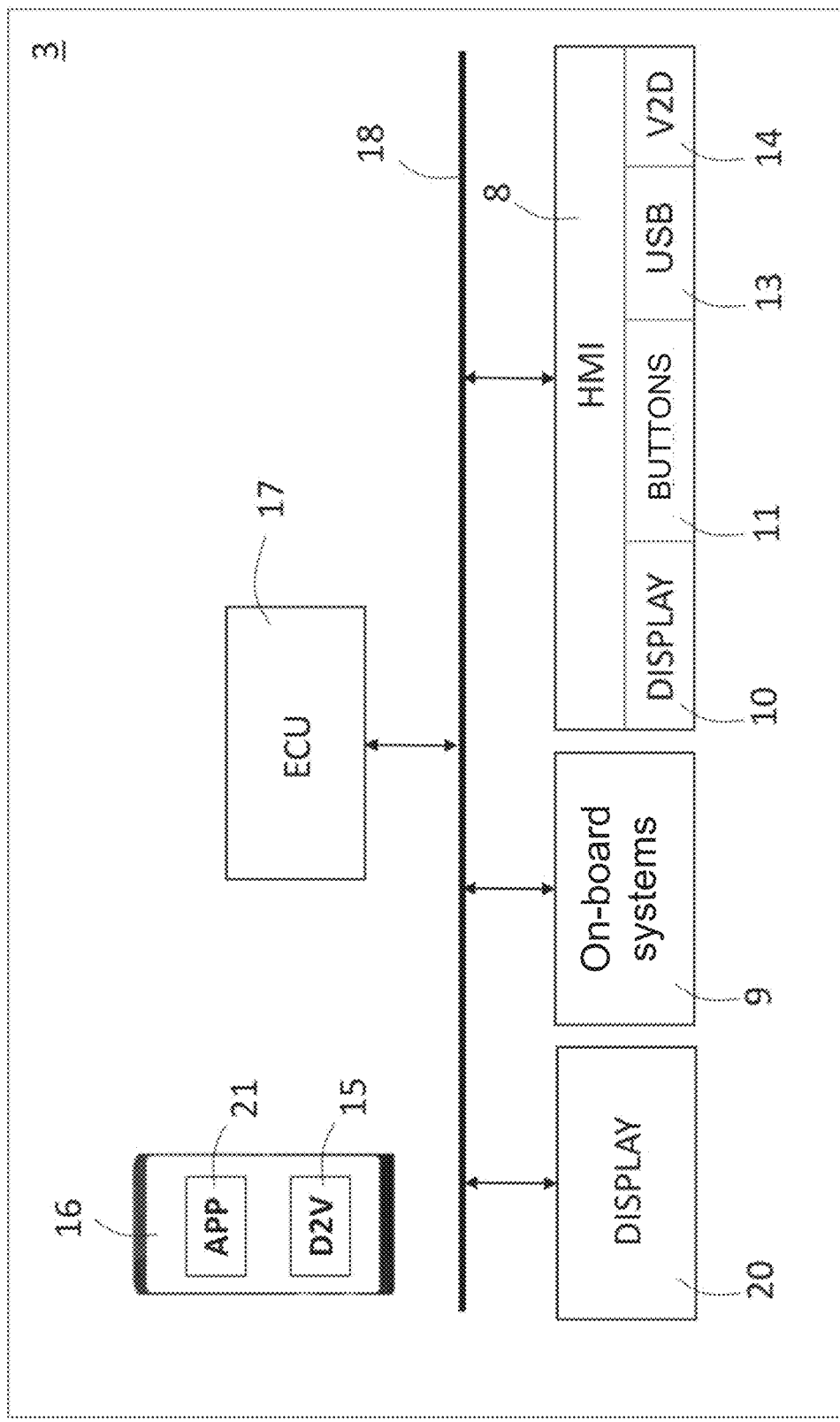
FIG. 3 shows a block diagram of an automotive interior customization system according to the invention.

With reference also to FIG. 3, the motor vehicle 3 further comprises an automotive user interface 8 (Human Machine Interface—HMI), through which the occupants of the motor vehicle 3 can interact with the different automotive on-board systems 9 of the motor vehicle 3.

The automotive user interface 8 comprises:

an electronic visual display 10, for example a touch-sensitive display, in the example shown integrated in the dashboard 2, at the central console 5, and on which a series of icons can be displayed, which are user-selectable by means of touch or suitable buttons, and relating to automotive functions concerning the operation of the automotive on-board systems 9, such as the infotainment system, the air conditioning system, the satellite navigation system, etc., function selecting and activating button 11 comprising hard buttons arranged in different points in the passenger compartment of the motor vehicle 3, for example on a steering wheel 12, on the central console 5, on the trim 7, close to the instrument panel 4 and the gear lever 6, and soft buttons, namely button which are displayed on the electronic visual display 10, a wired bidirectional communication system 13, conveniently in the form of the standard communication system known as USB (Universal Serial Bus) interface, which, as is known, comprises suitable connectors, known as USB connectors or ports, which are connectable to other USB connectors through suitable cables known as USB cables, a short range bidirectional wireless communication system 14, hereinafter referred to as V2D (Vehicle-to-Device) communication system, which is configured to automatically detect short range bidirectional wireless communication systems 15, hereinafter referred to as D2V (Device-to-Vehicle) communication systems, of user terminals 16 within its communication range, and to communicate with the D2V communication systems 15 detected and identified within its communication range, if necessary following a proper pairing procedure, depending on whether this procedure is required by the implemented communication technology, a software application (APP) 21 developed by the automotive manufacturer to allow users to interact with the automotive on-board systems 9 via the user terminals 16 on which the APP 21 has been loaded and is being executed, and an electronic control unit 17 electrically connected to the automotive user interface 8 and to the different automotive on-board systems 9 via an automotive onboard communication network 18, for example a CAN, FlexRay or similar network, and configured to control the latter in response, among other things, also to commands imparted by users via the automotive user interface 8.

The motor vehicle 3 further comprises an electronic customization system 19 to customize the automotive interior 1 according to the invention.

The idea on which the electronic customization system 19 is based is that of customizing the automotive interior 1 abandoning the traditional methodologies and exploiting instead the potentialities of the new information and communication technologies, which have been widely spreading since the so-called third industrial revolution.

In particular, the electronic customization system 19 according to the invention is designed to allow the automotive interior 1 to be customized through the automotive user interface 8.

Figure 2:
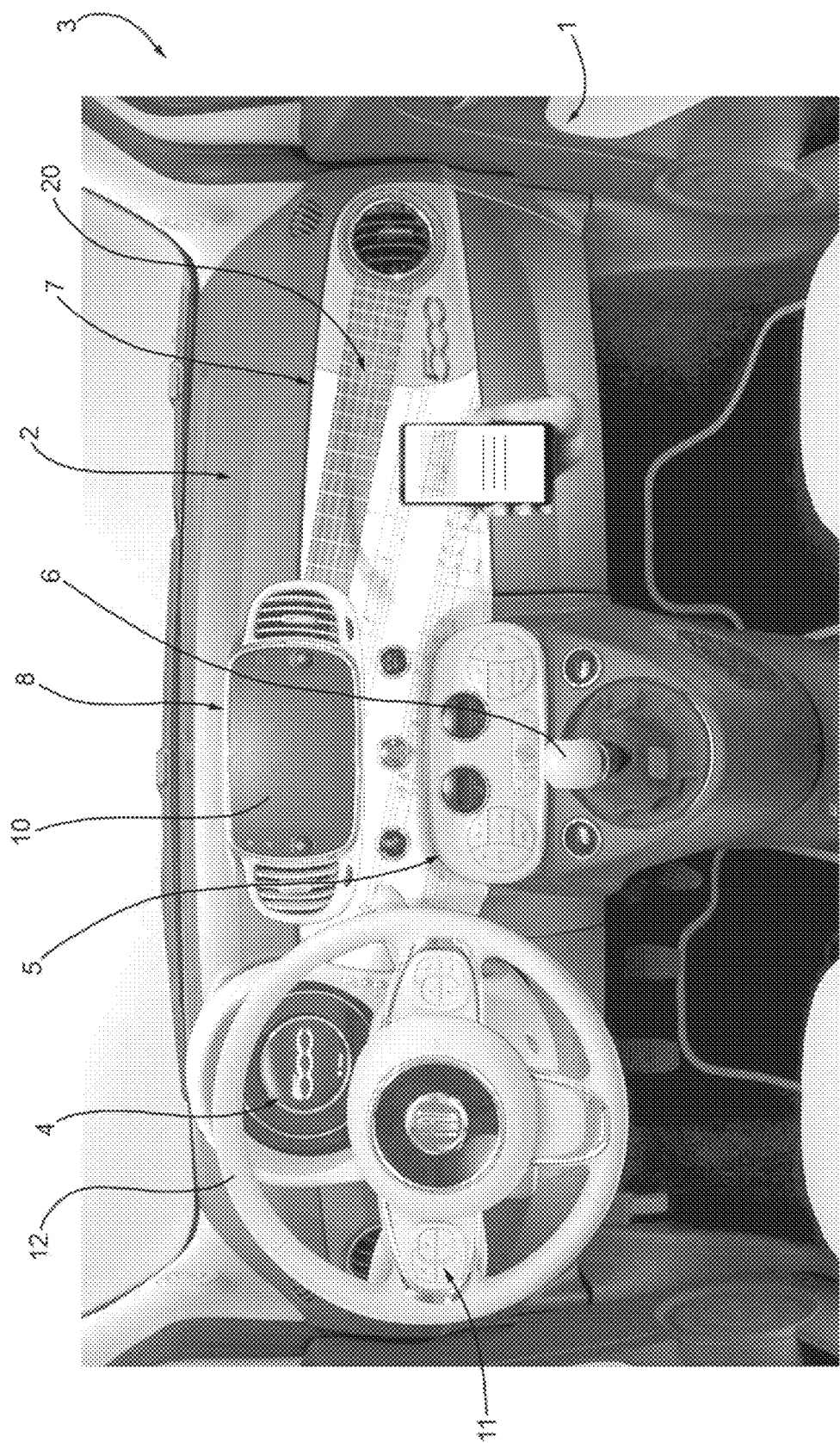

To this purpose, the electronic customization system 19 comprises one or more electronic customization displays 20 associated with one or more components of the automotive interior 1, only one of them, in particular the one associated with the moulding 7, is shown by way of example in FIGS. 1 and 2.

Other electronic customization displays 20 may be associated, for example, with the door panels, with tunnel console arranged in the central tunnel of the motor vehicle 3, between the driver's and the passenger's front seats, and ending at the front in the central console 5, with the backrests of the front seats or with the front headrests, with the roof, with the handle of the gear lever 6, etc.

The electronic customization displays 20 may be applied to the relevant aesthetic/functional components of the automotive interior 1 following the manufacturing thereof or they may conveniently be integrated in the relevant aesthetic/functional components of the automotive interior 1 upon manufacturing thereof.

An electronic customization display 20 may conveniently be a flexible electronic display, so that it may fit the shape of the area of the relevant aesthetic/functional component of the automotive interior 1 where the electronic customization display 20 is to be arranged.

An electronic customization display 20 may further preferably be a frameless electronic display, so that it may be coupled, in a flush manner and with continuity to the relevant aesthetic/functional component of the automotive interior 1, without the interposition of a frame, which would interrupt said continuity.

An electronic customization display 20 has a size which depends on the application for which it is designed, namely on the size and the shape of the aesthetic/functional component of the automotive interior 1 with which it is associated, which determine the area available for its application or integration, as well as on the current or future technology with which its manufactured.

In particular, an electronic customization display 20 may be sized to occupy only part of the exposed area of the aesthetic/functional component of the automotive interior 1 with which it is associated, or, if currently possible or possible in the future, even the entire exposed area of the aesthetic/functional component of the automotive interior 1 with which it is associated, as shown in FIG. 1.

In a preferred embodiment, an electronic customization display 20 is conveniently an electronic paper display (EPD), namely a display with an electrically-charged surface capable of reproducing the look and the experience of ink on paper.

This type of electronic display is also known as e-ink display, namely a display produced with an electrophoretic ink (e-ink) technology, which is currently used to manufacture the most common eBooks.

In particular, the electrophoretic ink technology allows manufacturers to obtain an electronic paper (e-paper), namely a support capable of reflecting ambient light like a traditional paper sheet, thus replicating the look of traditional ink on a normal paper sheet, with no need for pixel backlighting, as is instead required in liquid crystal technologies.

The physical process on which e-ink displays are based is electrophoresis and involves the use of electrically-charged spheres or capsules, which are very small-sized, are interposed between two electrode layers, one of which is transparent, formed by a multitude of electrodes arranged mutually facing in pairs.

In black-and-white e-ink displays, each sphere comprises a half-sphere, which is positively charged and coloured in black, and a second half-sphere, which is negatively charged and coloured in white. By properly controlling the two electrode layers in such a way that they apply suitable electric fields to the spheres, the spheres can be oriented so as to obtain a colour change in the different points of the display.

In coloured e-ink displays, an additional layer is provided, which is arranged on top of the spheres and designed to filter the light reflected by the spheres in order to give them colour.

E-ink displays may also be provided with a front lighting system, so as to result in this technology being also usable in environments without light.

This technology allows manufacturing thin and, especially, passive displays, namely displays that require a power supply only when the configuration of the spheres needs to be changed in order to change the content displayed on the displays, thus leading to the production of light devices with a high energy autonomy.

In a preferred embodiment, the electronic customization system 19 of the automotive interior 1 is designed to allow the automotive interior 1 to be customized through the user terminals 16.

The user terminals 16 are hand-held or wearable mobile user terminals, for example electronic personal mobile communication devices, such as smartphones, tablets, laptops, smartwatches, etc., and are provided with D2V communication systems 15, which are configured to detect V2D communication systems 14 in their communication ranges and to communicate with the V2D communication systems 14 detected and identified within their communication ranges, if necessary following a proper mutual pairing procedure, depending on whether this procedure is required by the implemented communication technology.

The V2D and D2V communication systems 14 and 15 are configured to support one or different short range communication technologies comprising, by way of example, the NFC technology, the Bluetooth technology, for example the one according to the 4.0 standard and also known as Bluetooth Low Energy, Bluetooth LE or Bluetooth Smart, the ZigBee technology, and the WiFi technology capable of connecting to a wireless local network (WLAN).

In a preferred embodiment, for the customization of the automotive interior 1, the V2D and D2V communication systems 14 and 15 are configured to communicate using the NFC technology, standing for Near Field Communication, which is a technology providing short range bidirectional wireless connectivity, in particular radio frequency (RF) connectivity, typically in the range from some centimetres up to a maximum of 10 cm. This technology, despite being characterized by reduced data transmission speeds, feature reduced power consumptions and do no require, unlike Bluetooth technology, the pairing of the V2D system with other NFC-based communication systems.

Furthermore, the NFC technology allows the electronic customization displays 20 to be electrically powered, namely with no need for electrical cables to electrically connect the electronic customization displays 20 to a electric power source on board the motor vehicle 3, in particular the electric battery or the electric battery pack of the motor vehicle 3. Indeed, the electromagnetic fields irradiated by the D2V communication systems 15 of the user terminals 16 may advantageously be exploited to induce, in e-ink electronic displays 20, electric currents which are sufficient to ensure the power supply the electronic customization displays 20, which power supply, as already mentioned above, is needed only when the configuration of the spheres has to be changed in order to change the content displayed on the electronic customization displays 20.

As it is known, the NFC technology evolved from a combination of contactless identification, in particular radio frequency identification (RFID), with other connectivity technologies, but, unlike the RFID technology, the NFC technology allows a bidirectional communication between two electronic devices provided with this type of technology, one called 'initiator' and the other one known as 'target', which are arranged close to one another within a range of some centimetres and cooperate in order to create a peer-to-peer network, through which they can send and receive data.

Nowadays, the NFC technology operates at a frequency of 13.56 MHz and can reach maximum transmission speeds of 424 kbit/s.

In a possible variant, for the customization of the automotive interior 1, the V2D and D2V communication systems 14 and 15 could use the Bluetooth technology, which requires the V2D and D2V communication systems 14 and 15 to be paired through a pairing procedure, which is typically started by the V2D communication system 14 and through which the V2D and D2V communication systems 14 and 15 mutually recognize through the exchange and the check of an identification code aimed at authorizing the exchange of data.

Furthermore, even though the V2D and D2V communication systems 14 and 15 can be paired with different short range bidirectional wireless communication systems, they can however communicate with only one of them at a time. Therefore, for this reason, the V2D communication system 14 makes a first attempt to establish a Bluetooth connection with the last—in time order—D2V communication system 15 to which it had been connected before the last connection and, in case the search for this paired D2V communication system 15 is unsuccessful, for example because it is turned off or not present on board the motor vehicle 3, it examines, one at a time, the other paired D2V communication systems 15, always following the same criterion, In a further possible variant, for the customization of the automotive interior 1, the communication between user terminals 16 and automotive user interface 8 could take place, instead of through the V2D and D2V communication systems 14 and 15, through the USB interface 13, namely through USB cables connected to USB connectors of the automotive user interface 8 and of the user terminals 16.

In order for the user terminals 16 to be used to customize the automotive interior 1, the user terminals 16 have to be programmable so as to result in them communicating, through the V2D and D2V communication systems 14 and 15, and cooperating with the electronic control unit 17.

To this aim, the user terminals 16 are provided with a software application (APP) 21, which could be an APP specifically dedicated to the customization of automotive interiors and downloadable from the main online APP stores, or could consist of an APP developed by the automotive manufacturer in order to allow users to interact with the automotive on-board systems 9 and in which this functionality is featured.

In particular, the APP 21 is designed to cause, when executed, a user terminal 16 to:

exposes, namely displays, on its own electronic display, a graphical user interface (GUI) designed to allow a user to select visual customization contents to be displayed on an electronic customization display 20, and communicates with the electronic control unit 17 through the V2D and D2V communication systems 14 and 15 in order to transmit data indicative of a selected visual customization content.

The electronic control unit 17 is further programmed to:

communicate with a user terminal 16 in order to receive data indicative of a selected visual customization content, and cause the selected visual customization content to be displayed on an customization electronic display 20.

The visual customization contents may be both static and dynamic—namely in motion—and may be in the form of digital images or sequences of digital images, such as, for example, wallpapers, patterns or skins, photographs, texts, videos, slide shows, etc.

In case the visual customization contents to be displayed on e-ink customization displays 20 are static, this allows manufacturers to use "storage-less" e-ink customization displays 20, namely displays without memory devices used to permanently store the visual customization contents, which are directly transferred from the user terminals 16 to the e-ink customization displays 20, with not need to be stored, event temporarily, in the e-ink customization displays 20.

As a consequence, the use of "storage-less" e-ink customization displays 20 prevents the motor vehicles 3 from having to be equipped with dedicated electrical wirings to electrically connect the e-ink customization displays 20 to an onboard electric power source, thus leading to the creation of completely passive electronic customization systems 19.

The graphical user interface is designed to allow a user to select a visual customization content in a library of visual customization contents, which may be stored either locally in the user terminal 16 or remotely in a web server and which may contain native visual customization contents and user-added visual customization contents, for example downloaded from the Internet or imported in another way.

Therefore, to this aim, the graphical user interface is designed to allow a user to search new visual customization contents on, and download them from, the Internet.

In order to reduce the amount of data exchanged between a user terminal 16 and the electronic control unit 17, the library of visual customization contents may conveniently be stored in the memory of the electronic control unit 17 and kept updated through an automatic synchronization procedure.

To this regard, the electronic control unit 17 may be further programmed to allow new visual customization contents to be imported through the USB interface 13.

Depending on whether the visual customization content to be displayed is stored in the electronic control unit 17 or not, the data indicative of the selected visual customization content and transmitted by the user terminal 16 may comprise simple data identifying a visual customization content stored in the electronic control unit 17 or may comprise the digital file of the selected visual customization content.

The transmission of data indicative of the selected visual customization content may be initiated in different ways, depending on the application and also on the communication technology used.

In particular, as shown in FIGS. 1 and 2, in the preferred embodiment in which the communication between the user terminals 16 and the electronic control unit 17 is based on the NFC technology, the transmission of the data indicative of the visual customization content may be initiated in response to a simple approach of a user terminal 16 to an electronic customization display 20.

In order to do so, the V2D communication system 14 is properly configured to cause the V2D and D2V communication systems 14 and 15 to mutually detect only when a user terminal 16 is in the proximity of an electronic customization display 20.

To this aim, the V2D communication system 14 comprises an NFC antenna arranged immediately close to the electronic customization display 20, so that the V2D and D2V communication systems 14 and 15 mutually detect only when the user terminal 16 is in the immediate proximity of the NFC antenna.

In case the electronic customization system 19 comprises different electronic displays 20, the procedure described above simple needs to be repeated for each electronic customization display 20.

In this embodiment, the V2D communication system 14 comprises an NFC antenna for each electronic customization display 20 on board the motor vehicle 3, and arranged immediately close to the electronic customization display 20.

In this embodiment, the APP 21 is further designed to:
allow a user to select, through the graphical user interface, either a multiple display mode, in which a selected visual customization content is simultaneously displayed on all the electronic customization displays 20, or a single display mode, in which a selected visual customization content is displayed on a single electronic customization display 20, and cause the user terminal 16 to communicate with the electronic control unit 17, through the V2D and D2V communication systems 14 and 15, and to transmit, together with the data indicative of the selected visual customization content, data indicative of the selected display mode.

As a consequence, the electronic control unit 17 is further configured to:
receive also data indicative of a selected display mode from a user terminal 16, and cause the selected visual customization content to be simultaneously displayed either on all of the electronic customization displays 20 or on a single electronic customization display 20 depending on the selected display mode.

Since it is transmitted together with the data indicative of the selected visual customization content, the data indicative of the selected display mode is transmitted in the same way as the one described above for the data indicative of the selected visual customization content.

In this embodiment, the V2D communication system 14 is further configured to identify the NFC antenna approached by a user terminal 16, so that the electronic control unit 17 can cause the selected visual customization content to be displayed either only on the electronic customization display 20 associated with the NFC antenna approached by the user terminal 16, if the single display mode has been selected, or on all the electronic customization displays 20, if the multiple display mode has been selected.

In case the communication between a user terminal 16 and the electronic control unit 17 is based on the Bluetooth technology, the transmission of data indicative of the user selections could be initiated in response to the simple pressing of a start button exposed by the graphical user interface.

In this embodiment, the APP 21 should also be designed to allow users to select, besides a visual customization content to be displayed, also the electronic customization display 20 on which the selected visual customization content is to be displayed.

The electronic customization system 19 could be designed to allow the automotive interior 1 to be customized using, in addition to or instead of the user terminals 16, the electronic user display 10 and the function selecting and activating buttons 11 of the automotive user interface 8.

In this case, the electronic control unit 17 should be programmed to perform the functions performed by the APP 21, namely to expose, on the electronic user display 10, the graphical user interface through which a user can select a visual customization content to be displayed on an electronic customization display 20 and, if necessary, the single or multiple display mode, to acquire the user selections, and to cause the selected visual customization content to be displayed on either a single electronic customization display 20 or on all the electronic customization displays 20, depending on the selected display mode.

Also in this case, the visual customization contents may comprise native visual customization contents stored by the automotive manufacturer and visual customization contents downloaded from the Internet and/or imported through the USB interface 13.

The description above allow the skilled reader to appreciate the advantages that the invention allows to achieve.

In particular, the invention allows automotive interiors to be customized in any moment and in a simple, intuitive, and economic fashion.

In particular, thanks to the invention, the automotive interiors may be customized both upon manufacturing of the motor vehicles, thus obtaining a so-called first-installation customization, and after the motor vehicles have been manufactured, this last option being particularly useful in order to allow automotive interiors to be customized by mobility service providers, for example short-, medium-, and long-term rental services or car sharing services.

Furthermore, the use of the e-ink displaying technology allows manufacturers to produce passive devices with an extremely low energy consumption and, hence, with a high energy autonomy.

Finally, the use of the NFC communication technology in combination with the "storage-less" e-ink display technology allows the electronic e-ink displays to be directly powered, namely without any need for electrical wirings to connect the electronic e-ink displays to the electric batteries of the motor vehicles.

The invention claimed is:

1. A system comprising:
    a motor vehicle including an interior, a vehicle user interface, one or more electronic customization displays, an electronic control unit, and vehicle on-board systems; and
    a user terminal that is a mobile device;
    wherein the one or more electronic customization displays are configured to be associated with one or more components of the interior; and
    wherein the electronic control unit is electrically connected to the one or more electronic customization displays, the electronic control unit performing the following operations:
        allowing the interior to be customizable via the vehicle user interface;
        causing the vehicle user interface to expose a graphical user interface designed to allow a visual customization content to be selected for display on an electronic customization display of the one or more electronic customization displays;
        acquiring a selection of a visual customization content; and
        causing the selected visual customization content to be displayed on the electronic customization display
    wherein:
    the user terminal is configured to allow a user to interact with the vehicle on-board systems and the vehicle user interface and the user terminal comprise respective communication systems that allow the vehicle user interface and the user terminal to communicate;
    the electronic control unit is electrically connected to the communication system of the vehicle user interface, and communicates with the user terminal via the communication systems of the vehicle user interface and of the user terminal, and cooperates with the user terminal to allow the interior to be customized via the user terminal;
    the user terminal is configured to:
    expose the graphical user interface; and
    transmit data indicative of the selected visual customization content to the electronic control unit;
    the electronic control unit further performs the following operations:
        receiving data indicative of the selected visual customization content from the user terminal; and
        causing the selected visual customization content to be displayed on the electronic customization display;
    the electronic customization display is an electronic paper display that is storage-less, not connected to any power source of the motor vehicle, and powered by the user terminal independent of any power source of the motor vehicle when the user terminal is brought within a threshold range of the electronic customization display, wherein when the user terminal is brought within the threshold range of the electronic paper display electromagnetic fields irradiated by the user terminal change orientation of electrically charged spheres or capsules of the electronic paper display to change content displayed in the electronic paper display;
    the communication systems of the vehicle user interface and the user terminal are short range bidirectional wireless communication systems that automatically detect, identify, and communicate with each other;
    the short range bidirectional wireless communication systems of the vehicle user interface and the user terminal communicate via Near Field Communication (NFC) technology;
    the short range bidirectional wireless communication system of the vehicle user interface causes the short range bidirectional wireless communication systems of the vehicle user interface and of the user terminal to mutually detect only when the user terminal is within a threshold range of the electronic customization display; and
    the user terminal is further configured to transmit to the electronic control unit data indicative of the selected visual customization content in response to an approach of the user terminal to the electronic customization display, wherein the approach causes the short range bidirectional wireless communication systems of the vehicle user interface and of the user terminal to mutually detect.

2. The system of claim 1,
    wherein the user terminal is further configured to:
        allow either a multiple display mode, in which a selected visual customization content is simultaneously displayed on all the one or more electronic customization displays, or a single display mode, in which a selected visual customization content is displayed on a single one of the one or more electronic customization displays, to be selectable via the graphical user interface;
        transmit to the electronic control unit also data indicative of a selected display mode; and
    wherein the electronic control unit is further configured to:
        receive also data indicative of the selected display mode from the user terminal; and
        cause the selected visual customization content to be displayed either simultaneously on all of the one or more electronic customization displays or on a single one of the one or more electronic customization displays depending on the selected display mode.

3. The system of claim 1, wherein the electronic customization display is a flexible electronic display.

4. The system of claim 1, wherein the electronic customization display is integrated in a component of the interior.

* * * * *